P. E. TANNER.
FLUID GAGE.
APPLICATION FILED JULY 11, 1912.
1,090,423.
Patented Mar. 17, 1914.
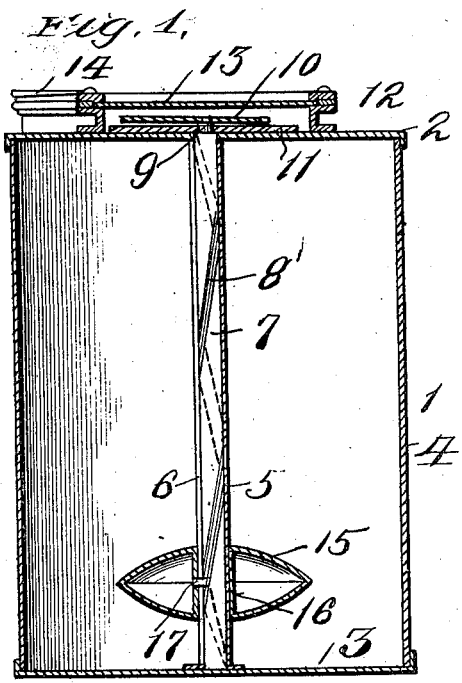
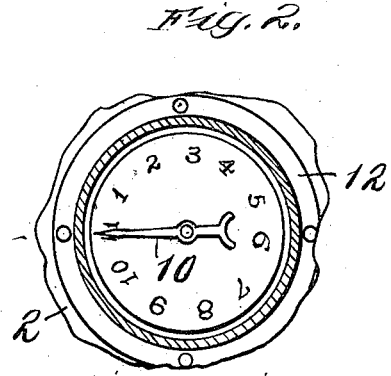
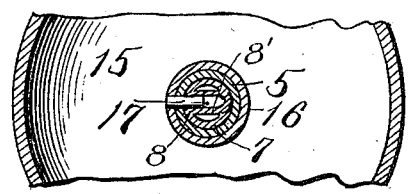
WITNESSES
INVENTOR
Perry E. Tanner,
by C E Humphrey
Attorney

UNITED STATES PATENT OFFICE.

PERRY E. TANNER, OF AKRON, OHIO.

FLUID-GAGE.

1,090,423.

Specification of Letters Patent. Patented Mar. 17, 1914.

Application filed July 11, 1912. Serial No. 708,796.

*To all whom it may concern:*

Be it known that I, PERRY E. TANNER, a citizen of the United States, residing at Akron, in the county of Summit and State of Ohio, have invented new and useful Improvements in Fluid-Gages, of which the following is a specification.

This invention relates to fluid gages by which the quantity of liquid contained in a vessel may be ascertained by the movement of an indicating finger over the face of a graduated dial and has especial relation to gages adapted to be used on the gasolene supply tank of an automobile.

The object of this invention is to provide a simple and effective structure of this kind which will accurately indicate the quantity of the fluid contained in the vessel and provide for the transmission of such indications on a dial capable of indicating the quantity accurately and in detail.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings in which similar reference numerals indicate like parts in the different figures, Figure 1, is a vertical central section of a containing vessel with my improved indicating gage in operative connection therewith. Fig. 2, is a plan view of the upper wall of the vessel showing the indicating finger and graduated dial; Fig. 3, is a horizontal, central sectional view of a float employed for actuating the indicating finger.

Referring to the drawings in detail, the reference numeral 1 denotes a vessel provided with an upper wall 2, a lower wall 3 and a side wall 4.

In the drawings, the vessel is shown as cylindrical in cross section, but any preferred cross sectional form for the vessel may be employed, as desired. Extending vertically in the vessel 1 is a cylindrical tube 5 provided with a longitudinally-extending slot 6 parallel with the axis of the tube 5. In practice, the tube 5 is secured to the upper wall in registering relation with an opening therein. Rotatably mounted within the tube 5 is a smaller tube 7 provided with a spirally-arranged groove 8 of approximately the same width as the groove 6 in the tube 5. The upper end of the tube 7 is provided with a shaft or pin 9 projecting upwardly through the wall 2 and on which is an indicating finger 10. Below the indicating finger and preferably secured to the upper face of the upper wall 2 of the vessel is a dial 11 subdivided into minor graduations which will when read in connection with the finger 10 indicate the contents of the vessel. Surrounding the dial 11 is a ring-shaped casing 12 adapted to hold a plate of transparent material, such as glass 13, to protect the indicating finger 10 and yet permit the ready reading of the gage therethrough. The upper end of the vessel is also provided with a filling-tube 14.

Surrounding the tube 5 is a hollow float 15 provided with a central aperture of sufficient size to freely slide on the fixed outer tube 5 and this opening is preferably inclosed by a cylindrical wall or tube 16 extending between the upper and lower walls of the float 15. Preferably radial with the tube 16 is a pin 17 which projects through the slot 6 and engages in the spiral trough-shaped guide 8', positioned in the tube 7 through the spiral slot 8 so that as the float shifts it is held from rotary movement by reason of the engagement of the pin 17 in the vertical slot 6 but at the same time the movement of the float will cause the pin 17 to co-act with the guide 8' to rotate the tube 7 and the indicating finger 10.

I claim:

A gage for fluid containing vessels comprising in combination, a dial, a fixed cylindrical outer tube extending throughout the depth of said vessel and provided with a longitudinal slot throughout its length parallel with its axis, a rotatable tube within said outer tube provided throughout its length with a spirally-arranged slot, a spiral trough-shaped guide secured in said rotatable tube with its open side at the slot of said rotatable tube, a pin on the upper end of said rotatable tube projecting through the top of the vessel and said dial, an indicating finger carried by said pin, a hollow float, a central sleeve through said float slidingly mounted for movement in a fixed path upon said outer tube, an inwardly-projecting radial guide pin carried by said float sleeve and extending through the slot in the outer tube and engaging in the spiral guide in said rotatable tube, whereby said indicating finger is actuated when the said float is shifted.

In testimony whereof I have hereunto set my hand in presence of two subscribing witnesses.

PERRY E. TANNER.

Witnesses:
A. E. KLING,
C. E. HUMPHREY.

Copies of this patent may be obtained for five cents each, by addressing the "Commissioner of Patents, Washington, D. C."